Feb. 26, 1924.

H. D. ARNOLD 1,485,156

SYSTEM OF DISTRIBUTION

Filed Aug. 28, 1917

Inventor:
Harold D. Arnold.
by J.G.Roberts Att'y.

Patented Feb. 26, 1924.

1,485,156

UNITED STATES PATENT OFFICE.

HAROLD D. ARNOLD, OF EAST ORANGE, NEW JERSEY, ASSIGNOR TO WESTERN ELECTRIC COMPANY, INCORPORATED, OF NEW YORK, N. Y., A CORPORATION OF NEW YORK.

SYSTEM OF DISTRIBUTION.

Application filed August 28, 1917. Serial No. 188,562.

*To all whom it may concern:*

Be it known that I, HAROLD DE FOREST ARNOLD, a citizen of the United States, residing at East Orange, in the county of Essex and State of New Jersey, have invented certain new and useful Improvements in Systems of Distribution, of which the following is a full, clear, concise, and exact description.

This invention relates to a system of power distribution in which a source of power delivers current at a frequency which depends on the tuning or resonant adjustment of a reactive circuit associated with the source. Such a source comprises a repeater, for instance, an electric discharge device, in which a small amount of energy is transferred from the output circuit of the repeater to its input circuit, and the repeater "sings" at a frequency which depends on the resonant condition or tuning of its circuit.

When such an oscillation generator is employed to supply current to a reactive load, i. e., either an inductive or condensive load, the load reacts on the generator and changes the frequency supplied thereby. To a less extent a change in a pure resistance load would react and affect the frequency. When the load is varied, the frequency of the generator varies accordingly, and this is objectionable, as it is desirable that the frequency supplied by the generator should remain constant, regardless of the character of the load connected to the generator.

According to the present invention, an oscillation generator of the type described is permitted to deliver current at a constant frequency, regardless of the nature of the load, by reason of the fact that the load is prevented from reacting on the generator. This is accomplished by connecting between the generator and the load a unilaterally conducting, i. e. an asymmetric, device, such as an electric discharge device. The discharge device transmits current from the generator to the load, but prevents the load from reacting on or disturbing the frequency supplied by the generator. This application is a continuation in part of application Serial No. 64,502, filed December 1, 1915, by applicant for systems of telephony.

Figure 1:
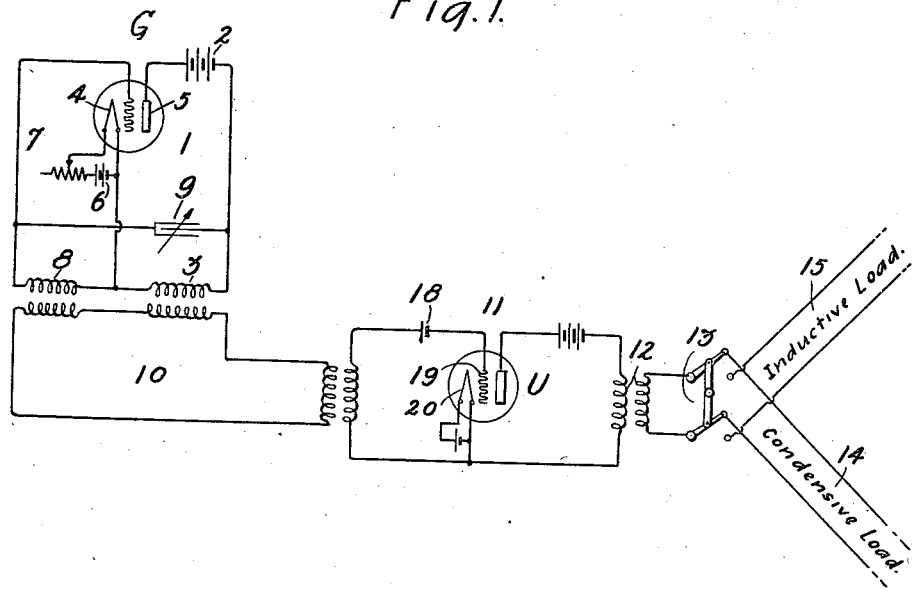
Figure 2:
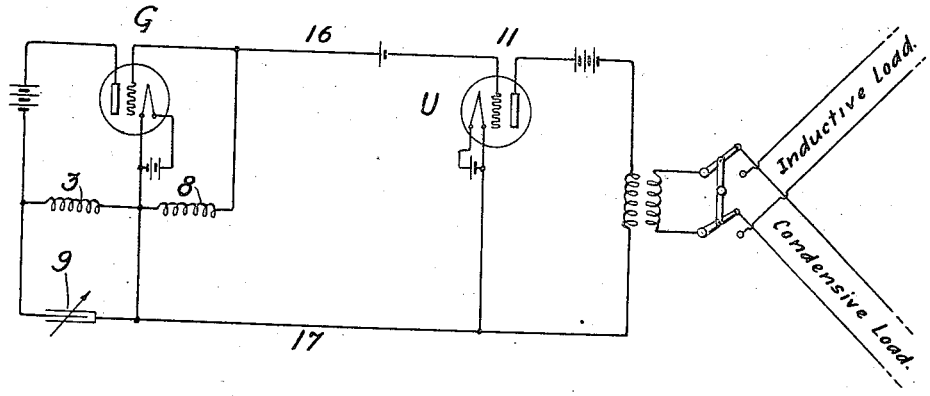

For further details of the invention reference is made to the drawings, in which Figs. 1 and 2 each show diagrammatically a system embodying the invention.

Referring to Fig. 1, the oscillation generator G is of the audion type, and is described and claimed in U. S. Patent No. 1,356,763, issued October 26, 1920, to Hartley. The space current in the output circuit 1 of this generator is supplied by the battery 2, through the coil 3 and between the filament 4 and plate 5. Filament 4 is suitably heated by means of the battery 6. Oscillations in the current in the output circuit are transferred or fed back by means of coil 3 to the input circuit 7 which includes the coil 8, by reason of the fact that the coils 3 and 8 are inductively related. The frequency supplied by this generator depends upon the adjustment of the variable condenser 9 connected in shunt to the coils 3 and 8.

The oscillations supplied by the generator G are transferred by means of the circuit 10 to the electric discharge repeater 11, which is similar to the electric discharge device described above and which is asymmetrically conducting. The output circuit of the discharge device 11 includes the primary winding of a transformer 12, the secondary of which is connected to a switch 13. This switch is adapted to connect the generator G and discharge device 11 to a condensive load 14 or to an inductive load 15. The loads 14 and 15 are diagrammatically shown as being representative of a reactive load. Battery 18 in the input circuit of discharge device 11 is adapted to keep the grid 19 at a suitable negative potential with respect to the filament 20.

Since the asymmetrically conducting discharge device 11 is interposed between the generator G and the load 14 or 15, it is obvious that the reactive load is prevented from reacting on and changing the frequency supplied by the generator G.

In Fig. 2 the oscillation generator G is similar to that described above and differs therefrom in that the condenser 9 is connected in shunt to only the output coil 3, instead of being in shunt to both coils 3 and 8 as shown in Fig. 1. Another difference is that the circuit 10 between the generator G and the discharge device 11 has been omitted so that in Fig. 2 these elements are directly connected by means of the lines 16 and 17. The operation of the asymmetric element in preventing reaction in the circuit shown in Fig. 2 is the same as that in Fig. 1.

While the invention has been described with particular reference to an oscillation generator in which the input circuit is fed solely from the output circuit, the idea is equally applicable to any regenerative device wherein the output circuit exerts a control over the device as by reacting on the input circuit, whether or not the regenerative device has also other control means as, for instance, in the case of a regenerative amplifier. The invention provides means whereby changes in the reactance of the load circuit are prevented from having the effect on the operation of the generator or oscillator of changes in the output circuit itself, and the term generator or oscillator in the claims should be interpreted broadly with this in view.

While an oscillation generator including an electric discharge device has been shown, the invention is obviously not restricted to this particular kind of a generator, as any other kind of oscillator may be used in which the frequency generated depends on the tuning of its circuit. Furthermore, any suitable asymmetric repeater device may be used instead of the discharge device 11.

What is claimed is:

1. An oscillation generator comprising a resonant circuit for determining the frequency supplied by said generator, a load circuit adapted to be energized by said generator and a three electrode electric discharge repeater for transferring alternating current energy from said generator to said load circuit and preventing said load circuit from reacting on said generator.

2. An oscillation generator susceptible to reactive effects, an alternating current load circuit and a three electrode asymmetrically conducting repeater for transferring alternating current of the generator frequency to said load circuit.

3. An oscillation generator susceptible to reactive effects, an alternating current load circuit and an audion repeater for transferring current of the generator frequency to said load circuit.

4. An oscillation generator of the feedback type, a reactive load circuit, an asymmetrically conducting repeater device having three electrodes, means for coupling said generator to two of said electrodes and means for coupling said load circuit to one of said first mentioned electrodes and to the third electrode.

5. An oscillation generator of the audion type, an alternating current load circuit and an audion repeater between said generator and said load circuit whereby the frequency of the current supplied by said generator is independent of the character of said load circuit.

6. An oscillation generator comprising a discharge device having an input circuit and an output circuit reacting on said input circuit, a load circuit for coupling said generator to a load, and an asymmetrically conducting repeater in circuit between said generator and said load for preventing said load from reacting on said generator.

7. In a system of distribution, an oscillation generator comprising a discharge device having an anode, a cathode and an impedance controlling electrode and input and output circuits, means for transferring energy from said output circuit to said input circuit, a load circuit energized from said output circuit, and a discharge device constituting a repeater having an anode, a cathode and an impedance controlling electrode connected between said output circuit and said load circuit whereby the load is prevented from reacting on said generator.

8. An electron discharge device having an input circuit and an output circuit reacting upon said input circuit, a load circuit energized from said output circuit, and an asymmetrically conducting repeater element between said output circuit and said load circuit.

9. In a system of distribution, a circuit for absorbing energy, a discharge device in said circuit for amplifying said energy, an output circuit for said discharge device, means for transferring energy from said output circuit back to said first circuit, a load circuit energized from said output circuit, and an asymmetrically conducting repeater device between said output circuit and said load circuit.

10. In a system of distribution, a discharge device having an anode, a cathode and an impedance controlling electrode and input and output circuits, means for transferring energy from said output circuit to said input circuit, a load circuit energized from said output circuit, and a discharge device constituting a repeater having an anode, a cathode and an impedance controlling element connected between said output circuit and said load circuit whereby the load is prevented from reacting on said first-mentioned discharge device.

11. A thermionic oscillator including a cathode and an impedance control element, a thermionic repeater also including a cathode and an impedance control element, means for connecting the cathodes of said oscillator and said repeater by a conductive path which is of negligible impedance for oscillating current, and means for connecting the control elements of said oscillator and said repeater by a conductive path which is of negligible impedance for oscillating current.

12. A thermionic oscillator including a cathode and an impedance control element, a thermionic repeater also including a cathode and an impedance control element, means for directly connecting the cathodes of said oscillator and said repeater and means for connecting the control elements of said oscillator and said repeater by a conductive path the impedance of which is substantially negligible for oscillating current.

13. A thermionic oscillator including a cathode and an impedance control element, a thermionic repeater also including a cathode and an impedance control element, means for directly connecting the cathodes of said oscillator and said repeater, and means for connecting the control electrodes of said oscillator and said repeater by a conductor including a polarizing source for the impedance control element of said repeater.

14. An oscillation generator comprising a discharge device having an anode, a cathode and an impedance controlling element, input and output circuits for said device, an oscillatory circuit comprising an inductance and capacity connected in parallel between said anode and cathode to determine the frequency of the oscillations generated, an inductance in said input circuit associated with the inductance of said oscillatory circuit and an amplifier comprising an anode, a cathode and an impedance controlling element, said cathodes and said impedance controlling elements being in parallel circuit relation respectively.

15. A generator of sinusoidally varying waves comprising reactance elements for determining the frequency of the waves generated, the frequency of said generator being affected by the reaction of other reactance elements on said frequency determining reactance elements, a reactive load circuit connected to said generator to be supplied with sinusoidal waves of the frequency of the waves generated by said generator, in combination with means for preventing said load circuit from affecting the frequency of the waves supplied comprising a space discharge repeater capable of repeating from said generator to said load circuit but not capable of repeating from said load circuit to said repeater.

16. A generator of alternating current waves the frequency of which varies as the impedance connected to said generator varies,—other things, being equal—; a load circuit of variable impedance to be supplied with alternating current of the frequency produced by said generator, and means for preventing said load circuit from reacting on and affecting the frequency of said generator comprising a unidirectional repeating device capable of repeating only in the direction from said generator to said load circuit.

17. Means for impressing an unvarying alternating voltage upon a load circuit of variable impedance comprising an alternating current generator of the type including a discharge device having a feed-back circuit and frequency determining reactance connected thereto, said generator being such that the uniformity of its oscillations would be destroyed by variations in impedance of a load connected thereto, and a repeater having an input circuit and an output circuit, the input circuit being connected to said generator and the output circuit being connected to said load circuit, said repeater being such that the impedance of the input circuit over the working range of frequencies is a substantially constant quantity independent of the electrical condition of the output circuit or of the load circuit connected thereto.

18. An oscillation generator comprising an electric discharge device having input and output circuits which are coupled in feed-back relation and which comprise reactances that substantially determine the frequency of the oscillations produced, a reactive load circuit to which oscillations are to be supplied, and an alternating current repeater having an input circuit associated with said generator to receive alternating current therefrom, and an output circuit associated with said load circuit to impress repeated alternating current of the frequency produced by said generator thereupon, said repeater input and output circuits being asymmetrically connected whereby the impedance of the input circuit is substantially negligibly influenced by the impedance conditions of said output circuit and said load circuit is prevented from reacting upon said generator to change the characteristics of the generated oscillations.

In witness whereof, I hereunto subscribe my name this 23rd day of August, A. D., 1917.

HAROLD D. ARNOLD.

DISCLAIMER 1,485,156.—*Harold D. Arnold*, East Orange, N. J. SYSTEM OF DISTRIBUTION. Patent dated February 26, 1924. Disclaimer filed December 20, 1935, by the assignee, *Western Electric Company, Incorporated*.

Hereby enters this disclaimer to the following claims, being claims 1 to 10 inclusive, 15 and 18 of said patent, in the following words, to wit:

"1. An oscillation generator comprising a resonant circuit for determining the frequency supplied by said generator, a load circuit adapted to be energized by said generator and a three electrode electric discharge repeater for transferring alternating current energy from said generator to said load circuit and preventing said load circuit from reacting on said generator.

"2. An oscillation generator susceptible to reactive effects, an alternating current load circuit and a three electrode asymmetrically conducting repeater for transferring alternating current of the generator frequency to said load circuit.

"3. An oscillation generator susceptible to reactive effects, an alternating current load circuit and an audion repeater for transferring current of the generator frequency to said load circuit.

"4. An oscillation generator of the feed-back type, a reactive load circuit, an asymmetrically conducting repeater device having three electrodes, means for coupling said generator to two of said electrodes and means for coupling said load circuit to one of said first-mentioned electrodes and to the third electrode.

"5. An oscillation generator of the audion type, an alternating current load circuit and an audion repeater between said generator and said load circuit whereby the frequency of the current supplied by said generator is independent of the character of said load circuit.

"6. An oscillation generator comprising a discharge device having an input circuit and an output circuit reacting on said input circuit, a load circuit for coupling said generator to a load, and an asymmetrically conducting repeater in circuit between said generator and said load for preventing said load from reacting on said generator.

"7. In a system of distribution, an oscillation generator comprising a discharge device having an anode, a cathode and an impedance controlling electrode and input and output circuits, means for transferring energy from said output circuit to said input circuit, a load circuit energized from said output circuit, and a discharge device constituting a repeater having an anode, a cathode and an impedance controlling electrode connected between said output circuit and said load circuit whereby the load is prevented from reacting on said generator.

"8. An electron discharge device having an input circuit and an output circuit reacting upon said input circuit, a load circuit energized from said output circuit, and an asymmetrically conducting repeater element between said output circuit and said load circuit.

"9. In a system of distribution, a circuit for absorbing energy, a discharge device in said circuit for amplifying said energy, an output circuit for said discharge device, means for transferring energy from said output circuit back to said first circuit, a load circuit energized from said output circuit, and an asymmetrically conducting repeater device between said output circuit and said load circuit.

"10. In a system of distribution, a discharge device having an anode, a cathode and an impedance controlling electrode and input and output circuits, means for transferring energy from said output circuit to said input circuit, a load circuit energized from said output circuit, and a discharge device constituting a repeater having an anode, a cathode and an impedance controlling element connected between said output circuit and said load circuit whereby the load is prevented from reacting on said first-mentioned discharge device."

"15. A generator of sinusoidally varying waves comprising reactance elements for determining the frequency of the waves generated, the frequency of said generator being affected by the reaction of other reactance elements on said frequency determining reactance elements, a reactive load circuit connected to said generator to be supplied with sinusoidal waves of the frequency of the waves generated by said generator, in combination with means for preventing said load circuit from affecting the frequency of the waves supplied comprising a space discharge repeater capable of repeating from said generator to said load circuit but not capable of repeating from said load circuit to said repeater."

"18. An oscillation generator comprising an electric discharge device having input and output circuits which are coupled in feed-back relation and which comprise reactances that substantially determine the frequency of the oscillations produced, a reactive load circuit to which oscillations are to be supplied, and an alternating current repeater having an input circuit associated with said generator to receive alternating current therefrom, and an output circuit associated with said load circuit to impress repeated alternating current of the frequency produced by said generator thereupon, said repeater input and output circuits being asymmetrically connected whereby the impedance of the input circuit is substantially negligibly influenced by the impedance conditions of said output circuit and said load circuit is prevented from reacting upon said generator to change the characteristics of the generated oscillations."

[*Official Gazette January 14, 1936.*]